United States Patent [19]

Stillwagon

[11] Patent Number: 4,877,323
[45] Date of Patent: Oct. 31, 1989

[54] METHOD AND APPARATUS FOR INSPECTING A HIGH SPEED WEB

[76] Inventor: W. C. Stillwagon, 7610 Ball Mill Rd., Dunwoody, Ga. 30338

[21] Appl. No.: 882,828

[22] Filed: Jul. 7, 1986

Related U.S. Application Data

[63] Continuation-in-part of Ser. No. 674,098, Nov. 23, 1984, abandoned.

[51] Int. Cl.⁴ ............................................. G01P 3/40
[52] U.S. Cl. ..................................... 356/23; 356/430
[58] Field of Search ..................................... 356/23–25, 356/237, 238, 429, 430

[56] References Cited

U.S. PATENT DOCUMENTS

| | | | |
|---|---|---|---|
| 2,473,625 | 6/1949 | Wheeler | 356/23 |
| 3,588,513 | 6/1971 | Akamatsu | 356/430 |
| 3,761,177 | 9/1973 | Corse | 356/23 |
| 4,134,684 | 1/1979 | Jette | 356/430 |
| 4,223,346 | 9/1980 | Neiheisel et al. | 356/430 |
| 4,225,227 | 9/1980 | Seitz | 356/23 |
| 4,680,205 | 7/1987 | Lerner et al. | 356/429 |

Primary Examiner—Richard A. Rosenberger
Attorney, Agent, or Firm—Needle & Rosenberg

[57] ABSTRACT

Printed webs leaving a printing press at speeds above 500 feet per minute are inspected with precision across the full width of the web by a stroboscope method and apparatus. Each repetitive image or design imprinted on the high speed web is rendered stationary relative to the eyes of a viewer at a web inspection station by bright short flashes of light emitted by an elongated xenon flash tube or tubes spanning the web transversely of its path of movement. Light flashes triggered by an improved strobe circuit which is synchronized with the images at all times permits an inspector to inspect any number of images, spaced around the press cylinder, whether or not the images are equally spaced. Additionally, the system can be used in either an image lock mode for side-by-side comparison with a standard or in a controlled pan or scroll mode to allow optimal inspection of entire impression sequences. Also, when desirable, both sides of the web can be inspected by utilizing a second flash tube configuration located behind the web.

17 Claims, 3 Drawing Sheets

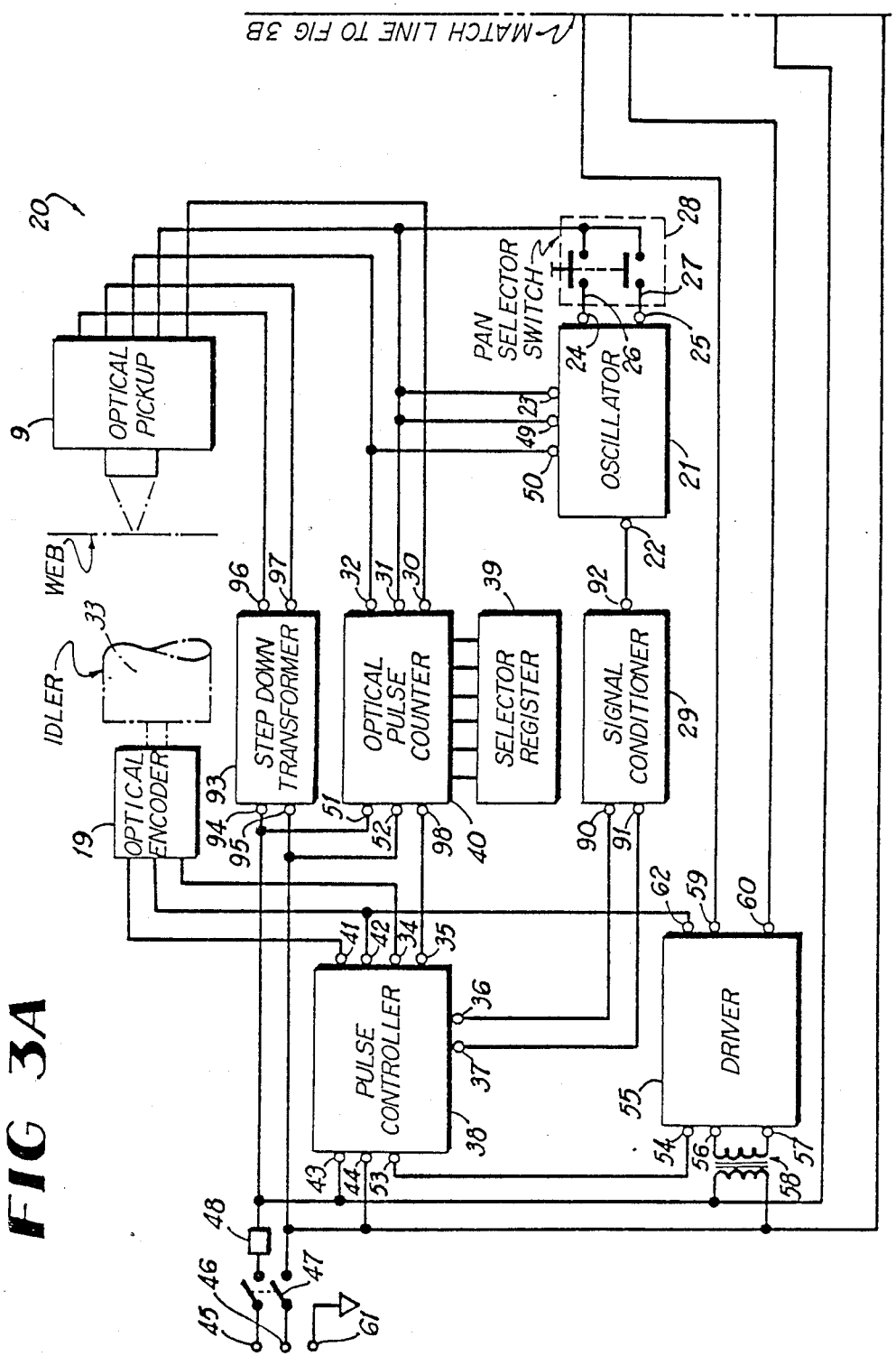

METHOD AND APPARATUS FOR INSPECTING A HIGH SPEED WEB

BACKGROUND OF THE INVENTION

This application is a continuation-in-part of application Ser. No. 674,098, now abandoned, the continuation of which, Ser. No. 018,597, issued as U.S. Pat. No. 4,714,340.

At high speeds, greater than 500 feet per minute (fpm), no known method or device exists which will reliably allow an operator to visually inspect the total product for conformity to a standard and to discover defects which sometimes occur in the printing process. Products requiring such inspection while traveling at high speeds include variously printed and coated webs, and continuous motion folding and closing operations. Prior art devices are particularly unable to inspect materials that are subject to stretch or are not printed with a symmetrical copy.

Inspection systems which employ "spot" strobe lights are inadequate because of an unduly limited viewing area. Furthermore, spot strobe light inspection systems are timed to provide a fixed or locked image and do not provide a pan or scroll mode whereby the operator can view images across an entire web under the optical illusion that the images are moving slowly through the field of view.

Revolving mirror devices, because of physical limitations, must operate parallel to web direction of movement and are realistically limited to web speeds of 500 fpm and below. Functional limitations preclude observing the web at 90° to its direction of travel and thus prevent the inspection of short repeats, typically under 5 inches.

Because of the above and other limitations in the prior art, there is a need for a more efficient, convenient and practical method and apparatus for visually inspecting high speed printed webs and the like, especially in situations in which the images are not symmetrically spaced around the press cylinder, in situations where there is no correlation between the printed image and the printing press drive, or when elastic or other materials subject to stretching are used as the web. The broad objective of this invention is to satisfy that need in a comparatively simple and economical manner.

SUMMARY OF THE INVENTION

A high speed web inspection method and apparatus according to the present invention employs a linear quartz xenon flash tube or tubes which may be of sufficient length to span an entire moving web transversely. A signal conditioning control circuit operates in conjunction with a high voltage power supply circuit to fire the xenon flash tube or tubes.

The signal conditioning control circuit receives pulse information from three different sources: an optical encoder, a photo cell pickup, and a clock oscillator. The optical encoder is driven by the press or other machine also driving the web to be inspected, and generates pulses directly proportional to the speed of the press. The photo cell pickup generates pulses based on detection of the contrasts in multiple colors or multiple markings on the web image being viewed. the clock oscillator generates a time controlled series of pulses.

The photo cell pickup output pulses are utilized to identify a common reference point or points of each image and to generate a synchronization pulse once for each image repetition. If the web images sensed by the photo cell pickup have a path in the direction of travel with one synchronizing mark per image, that location will be where the synchronization pulse is generated. However, if the photo cell pickup is focused on an area with a plurality of transitions for each image, the photo cell pickup will generate a plurality of pulses. The photo cell output is then input to a setable counter, which will reduce the plurality of pulses to one output pulse for each image.

In the lock mode, which appears to freeze the image, the photo cell pickup, through the presetable counter, generates an initial pulse as described above. This initial pulse triggers the strobe light and "zeroes" the signal conditioning circuit. Instantaneously, the signal conditioning circuit begins to count the pulses being independently generated by the optical encoder. The signal conditioning circuit continues to count the encoder pulses until the next photo cell pulse. The second photo cell pulse triggers the strobe and also shifts to memory the number of intervening optical encoder pulses between the two photo cell generated pulses. This sequence of actions defines the length of the pulse field for an image (the number of optical encoder pulses between photo cell pulses) and establishes an image reference point of the printed image to the moving web. This information is stored into signal conditioner's memory until such time that the image pulse field is changed during the pan mode.

In the slow pan mode, the signals from the clock oscillator and the optical encoder are processed through the signal conditioning circuit. In this mode, the defined image pulse field remains unchanged. However, synthetic pulses are added from the clock oscillator to reduce the time interval necessary to reach the end of the image pulse field. The shortened time interval causes the strobe to fire sooner and creates the illusion of scrolling the image at a metered rate. The clock oscillator adds an extra pulse every 0.01 minute to create the slow pan illusion. Since the defined image pulse field has not been expanded during the slow pan oscillator pulse additions, only the image reference end point of the printed image to the moving web has been changed. In the fast pan mode, the signal conditioning circuit operates as it does in the slow pan mode except that extra clock oscillator pulses are added every 0.001 minute.

Thus, the images on the moving web not only may be frozen or locked stationary at the viewing or inspection station under the stroboscopic effect, but they also may be panned or scrolled to create the optical illusion of slow movement of the printed image at the inspection station, so that the operator can visually inspect the web across its full width to discover defects in the images or to compare them with a standard.

Additionally, the invention also provides filtering of the light across the web which enhances the inspection procedure by permitting the discernment of features not readily visible under white light. An oblique light incidence angle on the web substantially eliminates viewer glare. Image synchronized viewing is rendered possible with a line of light transverse to the direction of web travel or parallel thereto, if desired. A large area of illumination (compared to spot strobes) allows more casual viewing by an operator.

Other features and advantages of the invention will become apparent to those skilled in the art during the course of the following description.

BRIEF DESCRIPTION OF THE DRAWINGS

FIGS. 3A and 3B, depict a power supply and control circuit for the linear xenon strobe flash tubes employed in the invention.

DESCRIPTION OF THE PREFERRED EMBODIMENT

Figure 1:
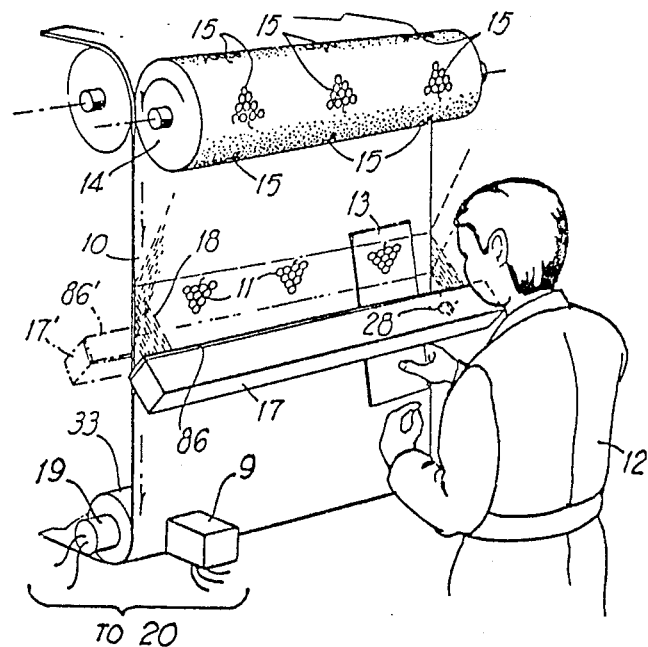
FIG. 1 is a perspective view of a high speed web inspection method and apparatus according to the invention, parts omitted.

The invention is now described in its preferred embodiment by referring to the drawings in detail, wherein like numerals designate like parts. In FIG. 1, a printed web 10 having longitudinally spaced images 11 imprinted thereon travels at high speed, in excess of 500 fpm, through an inspection station where an operator 12 visually inspects the printed web for possible defects and also may compare the printed images 11 with a standard 13 which may be hand held adjacent to the moving web 10.

Figure 2:
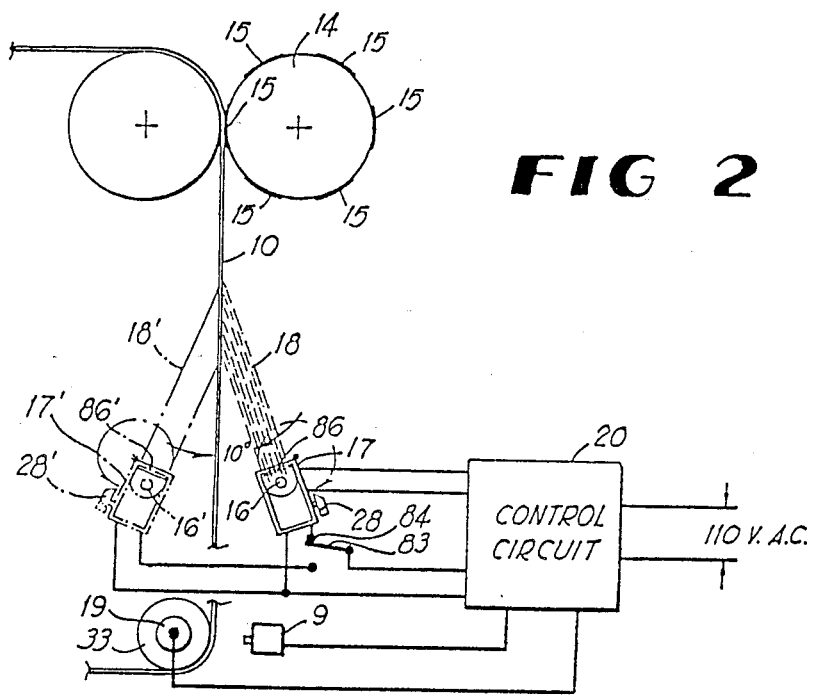
FIG. 2 is a partly schematic side elevation of the invention.

The printing press which produces the images or impressions 11 on the web includes an impression cylinder 14 driven conventionally at the required speed. This impression cylinder carries any desired number of identical impression elements 15 in circumferentially equidistantly or randomly spaced relationship on its periphery. These impression elements establish the transverse and longitudinal spacing of the images 11 on the web 10. In FIG. 2, six impression elements 15 are shown on the impression cylinder 14. Any number of spaced impression elements can be employed.

At least one, and possibly two, quartz xenon flash or strobe tubes 16 are located in end-to-end relationship, in an elongated rectangular housing 17, suitably mounted in front of or near the plane of the web 10 and extending transversely of the web at right angles to its direction of travel. The width of the printed web determines the necessity for using one, two or more straight elongated quartz xenon flash tubes 16 in the apparatus. Ideally, the flash tube housing 17 is mounted at an oblique angel of 10° to the path of movement of the web 10, but when desirable, it can be at an angle of 30°. This has the effect of drastically reducing glare produced by impingement of the strobe light beam 18 on the surface of the moving web. When inspection of the rear side of the web 10 is desired, another identical tube housing 17' is situated in a like manner behind the web 10.

The strobe lights are synchronized by means of a photo cell pickup 9, such as the SICK Optik-Electronik, Inc. Model NT8. The photo cell detects contrasts in black-and-white or colored material, and outputs signals for each transition. The photo cell may be focused on any desirable portion of the web. For instance, if a single registration mark is printed for each image at the edge of the web, the photo cell may be focused near the edge to sense the registration marks as they pass, thereby producing one pulse per image. On the other hand, the photo cell may be focused directly on a vertical path across the actual image. In that case, a fixed plurality of pulses will be generated from the photo cell for each image. The output of the photo cell 9 is directed to input terminal 30 of a presetable counter 40 (see FIG. 3A), such as Red Lion Controls Model SCP-4, which outputs a single pulse when a preset value is reached. Thus, if the preset value is adjusted to the number of light transitions in an image, one pulse will be generated per image. This may be accomplished by having the operator adjust the value at the selector register 39 starting at the value "1" and moving to higher values until the image stops. Alternately, the operator can estimate the number of transitions in an image and adjust register 39 around that value until the image is fixed.

Figure 3B:
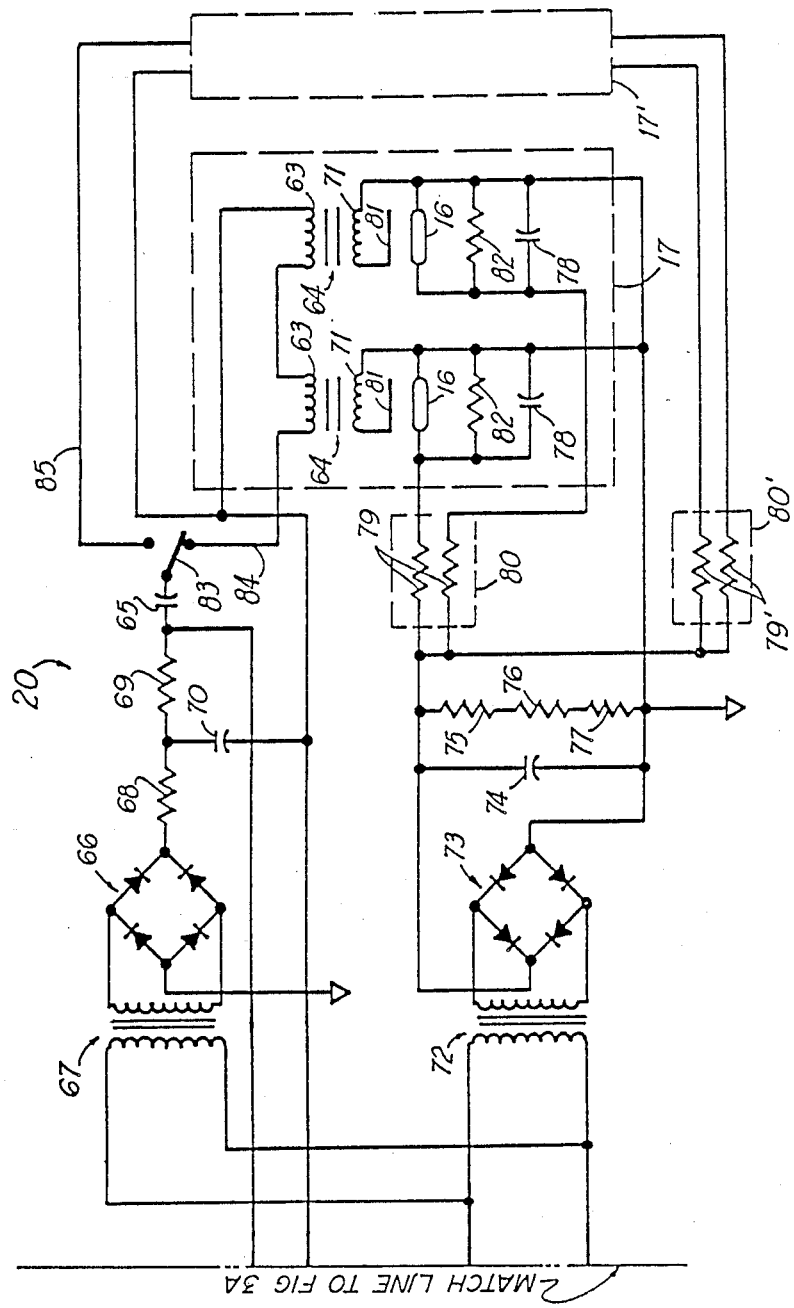

A pulse-type optical encoder 19, such as an Encoder Products Company Accu-Coder Model 711, can be coupled to an idler 33 shaft or can be surface mounted to produce a stream of pulses that is proportional to the speed of the web. The encoder 19 may produce, for instance, 60 pulses per encoder revolution which are fed to a control circuit 20, the details of which are shown in FIG. 3. Referring to FIG. 3A, the number of pulses from encoder 19 in an image is counted at input 34 of pulse controller 38 by beginning the count of encoder pulses when an output pulse is received from output 98 of optical pulse counter 40 at input 35 and terminating the count at the next pulse from counter 40, and then shifting the count at input 90 into a memory register inside signal conditioner 29. This stored image length value is used during the pan or scroll modes as described below. Also, in this lock or freeze mode, the pulse controller sends a signal at output 53 to trigger the strobe light.

A clock oscillator 21 is operable to provide a highly accurate fixed frequency output pulse train to terminal 22 which is sent to input 92 of signal conditioner 29. The clock oscillator 21 is comprised of, for example, a Model COS-1 oscillator module manufactured by Red Lion Controls and comprises a precision timing device whose output frequency is determined by connecting shunts or wire jumpers provided between terminals 23, 24 and 25. These jumpers, shown by reference numerals 26 and 27, are selectively coupled to or disconnected from terminal 23 by means of a manually operated three position switch device 28 shown in FIGS. 1 and 2 located on the flash tube housing 17. The switch 28 accordingly is adapted to control the output frequency of the oscillator 21 to various fixed frequencies which will be used by the control circuit 20 to create the illusion of freezing the images 11 in a first mode of operation, or to effect a slow or fast panning or scrolling of the images in a second mode of operation. The frequency of the oscillator 21 comprises one pulse per 0.01 minute and 0.001 minute for the slow pan and fast pan, respectively. The change of frequency creates the illusion of panning or scrolling the image, i.e., the longer the pulse interval, the slower the pan and vice versa.

Thus, in the pan mode, the signal conditioner 29 receives the pulse counts from the optical encoder 19 via the pulse controller 38 at input terminal 90 and from the oscillator 21 input at terminal 92. By adding the speed controlled optical encoder pulses to the time controlled oscillator pulses, the total number of pulses representing the image length will be artificially arrived at sooner than by only counting the intervening optical encoder 19 pulses, thereby triggering the strobe to fire the light sooner. In the pan mode, the digitized image length that is stored in the memory of the signal conditioner 29 remains unchanged. For the purpose of explanation, let us assume that the digitized image length is thirty pulses and that while in the pan mode twenty-six pulses are received at terminal 90 of signal conditioner 29 from the optical encoder 19 via the pulse controller 38, and that during this time four pulses are received at terminal 92 from the oscillator 21. The sum of the optical encoder 19 pulses and the oscillator 21 pulses received equals the digitized image length of thirty pulses, and at this instant an output pulse appears at terminal 91 of signal conditioner 29 and is input to terminal 37 of the pulse controller 38. Simultaneously, an output strobe triggering pulse appears at terminal 53. The premature triggering of the strobe after only twenty-six real time pulses from the optical encoder causes the illusion of panning or scrolling. The digitized image length remains unchanged, but a new image reference point or zero point is established. The panning or scrolling process can be repeated until such time that the operator deenergizes the selector switch 28.

Pulse controller 38 additionally includes an internal power supply, not shown, which is operable to provide a +12 VDC output across terminals 41 and 42 upon the application of an AC primary power input coupled across terminals 43 and 44. The +12 VDC supply potential appearing across terminals 41 and 42 of the pulse controller 38, moreover, is utilized to power the optical encoder 19. Optical pulse counter 40 additionally includes an internal power supply, not shown, which is operable to provide a +12 VDC output across terminals 31 and 32 upon the application of an AC primary power input coupled across terminals 51 and 52. The +12 VDC supply potential appearing across terminals 30 31 and 32 of the optical pulse counter 40, moreover, is utilized to power the oscillator 21 at inputs 49 and 50 and the sensor circuit of optical pickup 9. Stepdown transformer 93 provides a +4.5 VDC output across terminals 96 and 97, upon the application of an AC primary power input coupled across terminals 94 and 95, which is used to power the incandescent light source internal to the optical pickup 9. Further, the 110 VAC from terminals 45 and 46 is controlled via a two-pole, two position ON/OFF switch 47 and a power circuit breaker 48.

Next, the pulse output appearing at terminal 53 of the pulse controller 38 is coupled to input terminal 54 of a pulse driver amplifier 55 comprised of, for example, a model PJE1-2HP driver module manufactured by the Parametrics Company. The driver module 55 further includes an internal DC power supply, not shown, and accordingly, the 110 VAC power applied to terminals 45 and 46 is applied to terminals 56 and 57 via a transformer 58. The driver amplifier 55 operates to produce amplified trigger pulses for triggering flash lamps 16 at terminal 59. Further as shown, terminal 60 is connected to ground potential along with terminal 61 which is associated with the AC power line terminals 45 and 46. Terminal 62 is connected to a common DC return path coincident with terminal 42 of the pulse controller 38. The pulses appearing at output terminal 59 of the pulse drive module 55 are coupled to the series connected primary windings 63 of one or more trigger transformers 64 through a capacitor 65 which is also connected to a high voltage DC bias potential (600 volts) which is generated by a full wave diode bridge rectifier 66 connected to a transformer 67 and is coupled across the AC line potential in the same fashion as transformer 58. The 600 volt DC bias potential is further filtered by means of a pair of fixed resistors 68 and 69 and a fixed capacitor 70. When trigger pulses are applied to the primary windings 63 of the trigger transformer 64, the secondary windings 71 operate to produce 20 KV pulses which fire to flash tubes 16 in synchronism with the rotation of the impression cylinder 14.

In addition to the pulsing circuitry, the flash tubes 16 also require for their operation a high voltage power supply which provides a high voltage DC potential on the order of 2000 VDC. The high voltage power supply is comprised of the high voltage power transformer 72 whose primary winding is coupled across the AC line potential following the ON/OFF switch 47 and the circuit breaker 48. The secondary winding of the high power transformer 72 is connected to a full wave diode bridge rectifier network 73 across which is coupled an RC filter network comprised of the parallel combination of a fixed capacitor 74 and three series connected resistors 75, 76 and 77. The 2000 VDC high voltage potential operates to charge respective high voltage storage capacitors 78 located in the flash tube housing 17 through respective high powered resistors 79 located in a separate resistor box 80. The capacitors 78 operate to discharge through the flash tubes 16 to produce each strobe flash when a trigger pulse from the driver circuit module 55 is applied to the respective trigger electrodes 81 via the transformers 64. The capacitors 78 are recharged through the respective resistors 82 in the interval between flashes.

As shown, the embodiment schematically illustrated in FIG. 3 includes a flash tube housing 17 having two flash tubes 16 located therein. In the event that inspection of the rear surface of the web is desired, a second flash tube housing 17' is required, and is shown in FIGS. 1 and 2 located behind the web 10 with respect to the operator 12. Its components, moreover, are the same as shown in FIG. 3 with respect to the tube housing 17. It also requires a separate resistors box 80' including resistors 79. For the extra tube housing 17', however, a two-pole, two-position switch 83 is shown connected between the capacitor 65 and the two circuit leads 84 and 85. Switch 83 in one position is operable to connect trigger pulses from the driver 55 to the respective trigger transformer 64 of the tube housing 17 via circuit lead 84 while the other position connects the same trigger pulses to the tube housing 17'. Both sides of the web are not illuminated simultaneously because to do so would "blind" the operator.

Thus, what is provided by the arrangement described above is a strobe type of an inspection system which permits the operator to not only freeze the images 11 on the web 10, but also to pan or scroll the images at two different rates. Regardless of the mode selected, however, the image remains synchronized with the printing impression. In normal operation, the operator can leave the web strobe in the fixed image mode or in the slow pan mode. In the slow pan mode, the operator can casually, at press side or while performing other tasks in the immediate area, inspect the web for defects. When a defect is perceived, the operator can then switch to the fast pan mode to locate the questionable print quality. Once located, setting the selector switch to lock freezes the image for closer inspection.

When desirable, the inspection of short repeats, such as printed stamps, can be achieved by positioning the lamp housings 17 and 17' at an angle 90° relative to the direction of the web.

Since the triggering of the strobe is synchronized to the printed web with an optical pickup, there is total independence from the machine's drive. This independence makes this device an ideal tool for inspecting printed material on a slitter/rewind machine.

Also, high speed horizontal stream inspection, e.g., the continuous inspection of the gluing of cartons, can be achieved using the invention. Frequently, folding defects occur when the gluing machine operates at high speeds. The use of prior art apparatus such as video equipment has a very limited field of view. The subject apparatus can illuminate a lengthened line of sight with the pan function providing the "search" function. Another horizontal stream that can be inspected could be the progressive cutting of parts on a punch press. In the metal parts industry this stream of punched parts is called a carrier web.

It has also been discovered that placement of light filters, shown with reference numerals 86 and 86' placed at the opening of the flash tube housings 17 and 17', where the strobe beams 18 and 18' are emitted, markedly enhances the use of the apparatus. The filters 86 and 86', morever, are hinge mounted on the housings 17 and 17' so that they can be used or not used as desired. The filtered light permits the discernment of print features which are not readily visible under white light conditions. For example, using a subtractive color separation technique, i.e., magenta, cyan and yellow filters, aids in checking the colorimitry of the unfiltered color. Similarity, use of an ultra-violet filter (black light) will highlight luminous trace elements in inks and coatings.

Having thus shown and described what is at present considered to be the preferred embodiment of the invention, the same has been made by way of illustration and not limitation. Accordingly, all modifications, alterations and changes coming within the spirit and scope of the invention as defined in the appended claims are meant to be included.

What is claimed is:

1. A method of inspecting a high speed printed web having spaced repetitive impressions printed thereon, comprising the steps of:
   translating said web past a flash tube assembly including at least one flash tube adapted to be stroboscopically excited and a photocell for sensing light transitions;
   sensing at least one light transition in each printed impression on the portion of the web which passes said photocell;
   generating an electrical signal for each sensed transition;
   generating one strobe trigger pulse per repetition of the printed impression by dividing the frequency of occurrence of said generated electrical signals by the number of transitions in the photocell sensed portion of one impression;
   exciting said at least one flash tube with the trigger pulse to produce light flashes;
   directing said light flashes to one surface of the web whereby a stroboscopic effect is produced to produce a virtually stationary image of the impression of the web;
   generating a steady stream of pulses proportional to the speed of said web;
   counting the number of pulses of said steady stream of pulses between two contiguous strobe trigger pulses; and
   storing the value of said number of counting steady stream pulses.

2. The method of claim 1, whereby the trigger pulse generating step comprises the steps of dividing said generated electrical signals by means of a setable counter which counts said signals and generates a pulse each time a preset counter value is reached; and manually adjusting said preset counter value until the stroboscopic effect produces a fixed image.

3. The method of claim 1, wherein said web has a single register mark associated with each image, wherein said photocell is focused on said register marks and wherein the electrical signal from each sensed register mark generates a trigger pulse to excite said flash tube.

4. The method of claim 1, to further provide for inspecting said web in a controlled pan, further comprising the steps of:
   generating timed oscillating pulses; and
   modifying said strobe trigger pulse generating step by generating one strobe trigger pulse each time the total of said steady stream of pulses and said timed oscillating pulses since the last strobe trigger pulse equals the value stored in said value storing step.

5. The method of claim 4, wherein the frequency of said oscillating pulses may be varied to adjust the speed of the image panning.

6. The method of claim 1, wherein said printed web comprises elastic material.

7. The method of claim 1, wherein a plurality of light transitions is sensed in each printed impression by said photocell.

8. The method of claim 7, to further provide for inspecting said web in a controlled pan, which further comprises the steps of:
   generating a steady stream of pulses proportional to the speed of said web;
   counting the number of pulses of said steady stream of pulses between two contiguous strobe trigger pulses;
   storing the value of said number of counted steady stream pulses;
   generating timed oscillating pulses; and
   modifying said strobe trigger pulse generating step by generating one strobe trigger pulse each time the total of said steady stream of pulses and said timed oscillating pulses since the last strobe trigger pulse equals the value stored in said value storing step.

9. The method of claim 8, wherein the frequency of said oscillating pulses may be varied to adjust the speed of the image panning.

10. An apparatus for visually inspecting a high speed web being delivered from a machine, comprising:
    at least one flash tube adjacent to the surface of the web undergoing inspection;
    means for directing light from said flash tube to the surface of said web;
    means for exciting said flash tube upon the application of trigger pulses;
    means for optically sensing the light transitions of the web at one point and generating electronic signals for each of said transitions;
    electronic means for continuously counting the transitions sensed by said optical sensing means;
    means for generating one trigger pulse to said flash tube exciting means each time said counting means counts a predetermined value of transitions;
    encoding means for generating a steady stream of encoding pulses proportional to the rotational speed of said web;
    second counting means for counting the number of pulses generated by said encoding means between the continuous trigger pulses generated by said trigger pulse generating means; and memory storage means for retaining the value calculated by said second counting means.

11. The apparatus of claim 10, which further comprises an adjustable register from which said trigger generating means obtains said predetermined value of transitions.

12. The apparatus of claim 10, wherein said optical sensing means may be adjusted to be focused along the width of said web.

13. The apparatus of claim 7, which further comprises:

oscillating means for generating panning pulses at a regular periodic rate;

adding means for generating an alternate trigger pulse each time the combined total of said encoding pulses and said panning pulses since the previous trigger pulse equals the value stored in said memory storage means; and switch means for directing said alternate triggering pulses to said flash tube exciting means instead of said first trigger pulses.

14. The apparatus of claim 13, wherein the periodic rate of said oscillating means may be controllably varied.

15. The apparatus of claim 13, wherein said machine is a printing press and said web has impressions printed thereon.

16. The apparatus of claim 10, wherein said encoding means has no direct linkage to the machine.

17. The apparatus of claim 10, wherein said machine is a printing press and said web has impressions printed thereon.

* * * * *